United States Patent
Swoboda

(10) Patent No.: US 8,868,799 B2
(45) Date of Patent: Oct. 21, 2014

(54) TRACE DATA TRANSFER SYSTEM HAVING BURST AND MINIMUM THRESHOLD INPUTS

(71) Applicant: Texas Instruments Incorporated, Dallas, TX (US)

(72) Inventor: Gary L Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 13/738,830

(22) Filed: Jan. 10, 2013

(65) Prior Publication Data

US 2013/0198418 A1    Aug. 1, 2013

Related U.S. Application Data

(60) Provisional application No. 61/584,949, filed on Jan. 10, 2012.

(51) Int. Cl.
G06F 3/06    (2006.01)
G06F 5/06    (2006.01)
G06F 13/38    (2006.01)

(52) U.S. Cl.
CPC ............. *G06F 5/065* (2013.01); *G06F 13/38* (2013.01); *G06F 5/06* (2013.01)
USPC ............. 710/52; 710/2; 710/5; 710/8; 710/15

(58) Field of Classification Search
None
See application file for complete search history.

(56) References Cited

U.S. PATENT DOCUMENTS

2005/0039078 A1* 2/2005 Bradley et al. .................. 714/25
2005/0060501 A1* 3/2005 Shrader et al. ................. 711/149

* cited by examiner

*Primary Examiner* — Scott Sun
(74) *Attorney, Agent, or Firm* — Lawrence J. Bassuk; Frederick J. Telecky, Jr.

(57) ABSTRACT

This invention controls data transmission from a data source to a sink. The data source buffers the data. The data source signaling to transmit data upon storing a burst amount of data. The data source may include a plurality of data sources. A merge unit merges data by receiving and retransmitting data from each data source which signals to transmit and inserting a source identity block each time the merged data is received from a different source.

4 Claims, 1 Drawing Sheet

TRACE DATA TRANSFER SYSTEM HAVING BURST AND MINIMUM THRESHOLD INPUTS

CLAIM OF PRIORITY

This application claims priority under 35 U.S.C. 119(e)(1) to U.S. Provisional Application No. 61/584,949 filed Jan. 10, 2012.

TECHNICAL FIELD OF THE INVENTION

The technical field of this invention is trace data collection.

BACKGROUND OF THE INVENTION

The encoding efficiency of trace data containing source/data information must maximize the data component as the bandwidth or BW of export interfaces is limited. Certain approaches used today waste some of this BW.

SUMMARY OF THE INVENTION

This invention ensures that components transporting trace information do so in a manner that facilitates maximizing the amount of data in the data stream. This invention increases the number of burst transfers on a bus and 10 thus increases available bandwidth utilization five or more percent

BRIEF DESCRIPTION OF THE DRAWINGS

These and other aspects of this invention are illustrated in the drawings, in which.

DETAILED DESCRIPTION OF PREFERRED EMBODIMENTS

In a system where trace data is transferred using a trace protocol that embeds the source of trace data in the trace stream, the percentage of information that is source identification must be minimized. It is preferable to minimize transmission of source identification to best utilize channel bandwidth. The source identification is not useful data to the utilization device but is needed to distinguish between data streams. Minimizing changes between data sources would minimize the need for source identification.

Prior art systems that merge data from multiple sources typically respond to a request from a source when it has any data to export. The source requests a transfer when it has at least one data item to export. The prior art merge component honors this request and accepts data from the source on n consecutive clock cycles if requested to do so.

Figure 1:
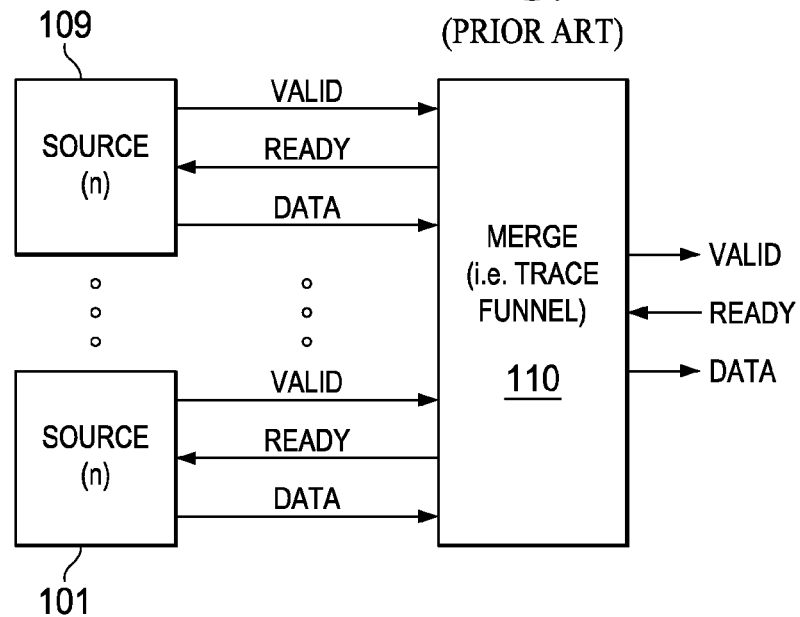
FIG. 1 illustrates a system that merges data from multiple sources in response to a source indicating it has a data item to export (prior art)

This is illustrated in FIG. 1. N data sources 101 to 109 each receive trace data from a data processing apparatus to be monitored. Each source 101 to 109 supplies a valid signal to merge unit 110. When merge unit 110 is ready to accept data from a source, it sends a ready signal to that source. The corresponding source then transmits the data to merge unit 110. Upon sending the data the source 101 to 109 then deactivates its valid signal. This indicates that the source has no data to supply to merge unit 110. In the prior art merge unit 110 may supply its merged data to another circuit using a similar protocol.

In passing this data to the downstream circuit, merge unit 110 must identify the data source. The permits the downstream circuit to properly use the data. In the prior art merge unit 110 typically transmits the source identity block in parallel with the data. However, it is also typical in the prior art to serialize this transmission downstream. Upon this serialization the prior art generally appends a source identity block corresponding to the data source before each data from a new source. The downstream circuit assumes any following data is from the same source unit until receipt of a new source identity block.

If four sources generate a data element every fourth clock, merge unit 110 services each source every fourth clock accepting data from sources sequentially from sources A, B, C, and D. This produces a merged data stream of:

ID(A): DATA
ID(B): DATA
ID(C): DATA
ID(D): DATA

Note this requires a source identity block [ID(A), ID(B), ID(C), ID(D)] before each block of data. There is one source identity block for each data block.

If the sources buffer four data items and request the transfer of this data when there are four data elements, the merged data stream becomes:

ID(A): DATA, DATA, DATA, DATA;
ID(B): DATA, DATA, DATA, DATA;
ID(C): DATA, DATA, DATA, DATA;
ID(D): DATA, DATA, DATA, DATA;

There is one source identity block for four data blocks. Thus the ratio of DATA to IDs is four to one.

If the data is 64 bits in length and the ID is eight bits in length, 88% of the bandwidth is used when transmitting data in the one ID per Data case. Under the same assumptions of data block length and ID length, when there is one ID per four data elements 97% of the available data bandwidth is data. This difference in data packaging provides data utilization of roughly 9% better.

The goal is to generate a more dense data stream. In the absence of a flush request, the sources should issue a transfer request to the merge component when the source has sufficient data to utilize the merge component's burst capability. This actions generates a more dense trace stream. A source should therefore:

In the absence of a flush request, request a transfer when it is ready to the transfer of a burst of information equal to or greater than the burst length of the merge component;

Following a flush request and subsequently until it has no data to send, request a transfer when it has any information to export.

Figure 2:
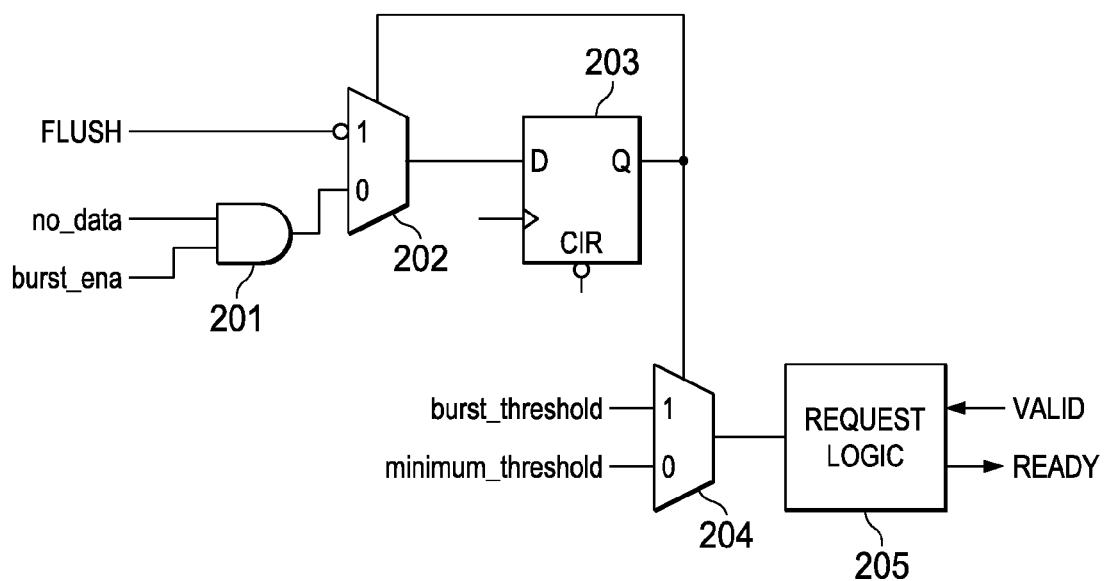
FIG. 2 illustrates a system that merges data from multiple sources that operates in selectable bursts in accordance with this invention.

One implementation for improved source characteristics is shown in FIG. 2. AND gate 201 receives a no_data signal indicating the source has no data to supply and a burst_enable signal indicating that bursting is enabled for this corresponding source. Multiplexer 202 has an inverting input receiving a flush signal at the 1 input and a 0 input receiving the output of AND gate 201. Multiplexer 202 supplies the inverted flush signal if it receives a 1 on its selection input and the output of AND gate 201 if it receives a 0 on its selection input.

Flip-flop 203 has a D input receiving the output of multiplexer 202. The Q output of flip-flop 203 supplies the selection inputs of both multiplexer 202 and multiplexer 204. Multiplexer 204 receives a burst_threshold flush signal at the input and a mimimum_threshold signal at the 0 input. Multiplexer 204 supplies the burst_threshold signal if it receives a 1 on its selection input and the minimum_threshold signal if it receives a 0 on its selection input.

Request logic 205 receives the output of multiplexer 204. Request logic 205 generates the valid and ready signals previously described.

Request logic 205 generates the valid flag in two states. Multiplexer 202 has an inverting input receiving a flush signal at the 1 input and an input receiving the output of AND gate 201. Multiplexer 202 supplies the inverted flush signal if it receives a 1 on its selection input and the output of AND gate 201 if it receives a 0 on its selection input. Multiplexer 202 has an inverting input receiving a flush signal at the 1 input and an input receiving the output of AND gate 201.

Request logic 205 operates in one of two states set by the state of flip-flop 203. If flip-flop 203 causes multiplexer 204 to select burst_threshold, then request logic 205 generates the ready signal only if the amount of data ready to transmit by the corresponding source equals burst_threshold. In the current example this is four 64-bit words. If flip-flop 203 causes multiplexer 204 to select minimum_threshold, then request logic 205 generates the ready signal only if the amount of data ready to transmit by the corresponding source exceeds minimum_threshold. Minimum_threshold is less than burst_threshold and could be a small as one data block.

With burst enabled and in the absence of a flush, request logic 205 operates in burst mode only signaling ready when the amount of data equals burst_threshold. Upon a flush, flop-flop 203 changes state at the next clock. This switches request logic 205 to signaling ready upon the minimum_threshold. Flip-flop 203 remains in this state until there is no remaining data. With burst enabled and no data, flip-flop 203 changes state at the next clock.

What is claimed is:

1. A trace data transfer system comprising:
 A. request logic having a valid output lead, a ready input lead, and a threshold control input lead;
 B. first multiplexer circuitry having a control input, a burst threshold input, a minimum threshold input, and a threshold control output coupled to the threshold control input lead; and
 C. flip-flop circuitry having a non-inverting output coupled to the control input of the first multiplexer circuitry.

2. The system of claim 1 in which the flip-flop circuitry has a data input and a clock input, and including second multiplexer circuitry having a control input coupled with the non-inverting output of the flip-flop circuitry, a flush input, and a second input, and gating circuitry having a no data input, a burst enable input, and an output coupled to the second input of the second multiplexer circuitry.

3. The system of claim 1 in which the request logic produces a ready signal only if an amount of data to be transmitted equals or exceeds a burst threshold indicated by the burst threshold input.

4. The system of claim 1 in which the request logic produces a ready signal only if an amount of data to be transmitted equals or exceeds a minimum threshold indicated by the minimum threshold input.

\* \* \* \* \*